United States Patent [19]
Krehl

[11] Patent Number: 5,784,996
[45] Date of Patent: *Jul. 28, 1998

[54] FEED CONVEYOR

[75] Inventor: Michael E. Krehl, Corunna, Ind.

[73] Assignee: CTB, Inc., Milford, Ind.

[*] Notice: The term of this patent shall not extend beyond the expiration date of Pat. No. 5,605,113.

[21] Appl. No.: 742,655

[22] Filed: Nov. 4, 1996

Related U.S. Application Data

[63] Continuation of Ser. No. 517,813, Aug. 22, 1995, Pat. No. 5,605,113.

[51] Int. Cl.$^6$ .............................. A01K 5/02; B65G 19/04
[52] U.S. Cl. .................. 119/57.92; 119/57.1; 119/57.2; 198/834
[58] Field of Search ........................ 119/51.01, 57.1, 119/57.2, 57.3, 57.92; 198/834

[56] References Cited

U.S. PATENT DOCUMENTS 3,094,206  6/1963  Stewart et al. ................ 198/834

*Primary Examiner*—Michael J. Carone
*Assistant Examiner*—Elizabeth Shaw
*Attorney, Agent, or Firm*—Trexler, Bushnell, Giangiorgi & Blackstone, Ltd.

[57] ABSTRACT

A feed conveyor for delivering feed to poultry cages, floor animals or the like includes a continuous trough member for holding the feed; a continuous spring element which is disposed within and throughout the trough member, and a driving mechanism which moves the spring element along the trough member to move the feed through the trough member to deliver the feed to the poultry cages, floor animals or the like. The spring element is a substantially planar, tortuous member, which is made of a suitable material such as high tensile steel, and which is disposed in a lower portion of the trough member. Preferably, the spring element lays along the bottom of a generally flat-bottomed trough member. The driving mechanism, which may take the form of a mechanically driven sprocket, moves the spring element along the bottom of and through the trough member to move the feed through the trough member to the various poultry cages, floor animals or the like.

22 Claims, 3 Drawing Sheets

FEED CONVEYOR

This application is al continuation of application No. 08/517,813, filed Aug. 22, 1995, U.S. Pat. No. 5,605,113.

BACKGROUND OF THE INVENTION

This invention is generally directed to a feed distribution apparatus for animals. Specifically, the present invention is directed to a feed conveying system for caged poultry or floor animals and/or as a feed delivery system which uses a novel spring conveyor to move the feed through the system.

Poultry are usually housed in a series of cages for the purpose of delivering eggs. These cages can be constructed as a stepped-back pyramidal array, as disclosed in U.S. Pat. No. 4,060,055. Likewise, floor animals are usually housed in a series of cages for feeding purposes.

In order to efficiently and cost effectively feed the poultry or floor animals, mechanized conveying systems are employed. These types of conveying systems typically include a feed conveyor which has a series of troughs within which is located a feed moving element. The troughs are usually closed tube sections, or open tube-like troughs which are located adjacent to the cages. When feed is delivered to the troughs and the feed moving element is actuated by a driving mechanism, the feed is moved along the troughs by action of the feed moving element to various feed delivery locations at which poultry is located.

Some such feed conveying systems, such as the one disclosed in U.S. Pat. No. 4,495,894, use a continuous helical spring as the feed moving element. When the helical spring is rotated by the driving mechanism, the feed is moved along the trough with an auger motion. The helical spring is not substantially displaced in the axial direction along the trough.

In other such feed conveying systems, the feed moving element is pushed or pulled through the trough by a driving mechanism. One example of this type of a feed conveying system is disclosed in U.S. Pat. No. 2,681,639 which uses a flexible, multi-link chain.

These systems, while effective for delivering feed to the various locations where poultry or floor animals are located, consume a substantial amount of energy to run. As such, thousands of dollars are used each year to run such systems. The present invention provides a novel feed conveying system used in a feed distribution apparatus which consumes substantially less power than that of prior art systems while effectively delivering feed to poultry, floor animals or the like.

OBJECTS AND SUMMARY OF THE INVENTION

A general object of the present invention is to provide a novel feed conveyor system for caged animals, such as poultry or the like, floor animals and/or as a feed delivery system which is used in a feed distribution apparatus.

Another object of the present invention is to provide a novel feed conveyor system in which feed is moved through the system by using significantly less power than prior art feeding systems.

Briefly, and in accordance with the foregoing, the present invention discloses a novel feed conveyor for use in a feed distribution apparatus for delivering feed to poultry cages, floor animals or the like. The feed conveyor includes a continuous trough member for holding the feed; a continuous spring element which is disposed within and throughout the trough member, and a driving mechanism which moves the spring element along the trough member to move the feed through the trough member to deliver the feed to the poultry cages, floor animals or the like. The spring element is a substantially planar, tortuous member, which is made of a suitable material such as high tensile steel, and which is disposed in a lower portion of the trough member. Preferably, the spring element lays along the bottom wall of a generally flat-bottomed trough member. The driving mechanism, which may take the form of a mechanically driven sprocket, moves the spring element along the bottom of and through the trough member to move the feed through the trough member to the various poultry cages, floor animals or the like.

Other objects and advantages of the invention will become apparent upon reading the following detailed description and upon reference to the drawings.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figures 1, 2:
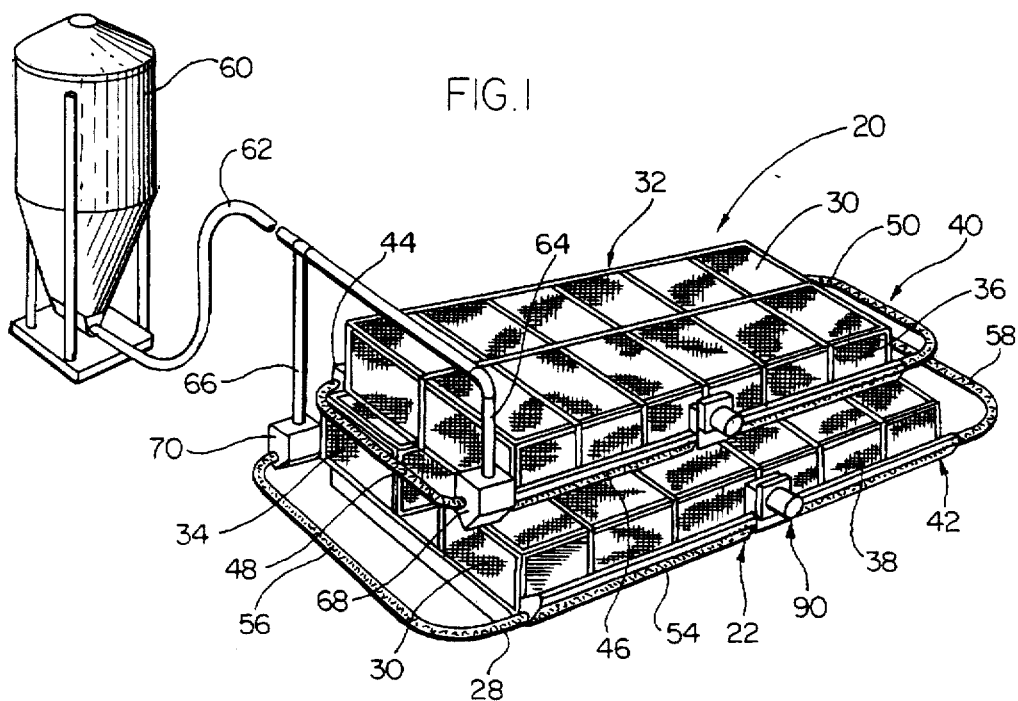
FIG. 1 is a perspective view of arrayed animal cages and a novel feed conveying system in accordance with the present invention.
FIG. 2 is a perspective view of a portion of the feed conveying system showing a first embodiment of a trough member having feed therein, the feed being partially cut away to show a novel spring element in accordance with the present invention along a bottom portion of the trough member.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

A feed distribution apparatus 20 includes a novel feed conveying system 22 for moving feed 24 throughout a series of tubes and troughs. The feed conveying system 22 of the present invention includes a novel feed moving element 28, which moves the feed 24 along the tubes and troughs while using substantially less power for operation than prior art systems.

Figure 6:
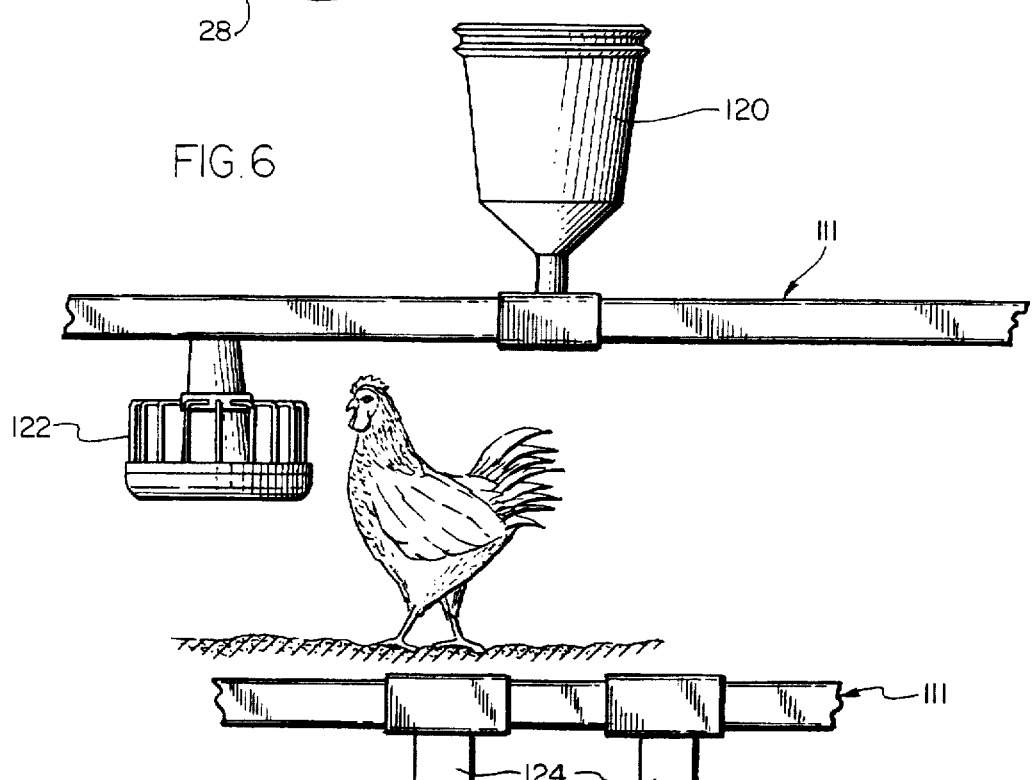
FIG. 6 is a front elevational view of the feed conveying system being used to feed poultry.
Figure 7:
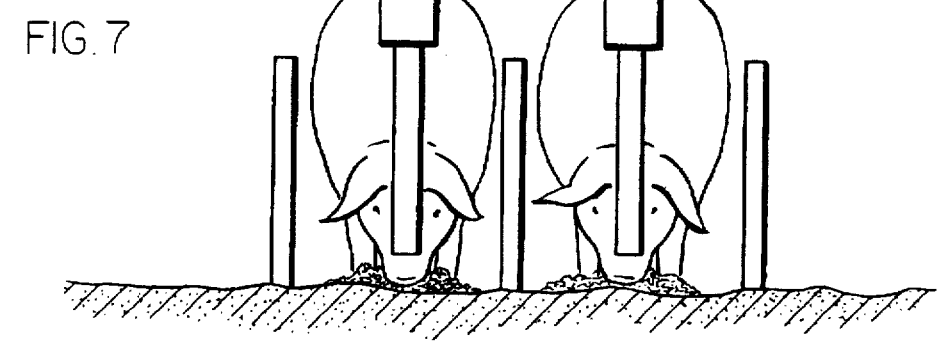
FIG. 7 is a front elevational view of the feed conveying system being used to feed floor animals, such as hogs.

Directing attention first to FIG. 1, the feed conveying system 22 is shown as it appears when it is installed for use with an array of poultry confinement cages 30 or the like. The feed conveying system 22 of the present invention can also be used to deliver feed to floor animals, such as poultry, hogs and the like, as shown in FIGS. 6 and 7. The set of cages 30 takes the form of an oppositely facing, pyramidal, stepped back, multi-level array constructed in accordance with U.S. Pat. No. 4,060,055. It is to be understood, however, that the novel feed conveying system 22 of the present invention can be used with other cage constructions and arrays and for floor animals and the like.

The array of cages 30 includes an upper row of cages 32 and a lower row of cages 34 which face in a first direction. Another upper row of cages 36 and a lower row of cages 38 face in an opposite direction to that of the first direction.

The feed conveying system 22 of the present invention includes an upper endless trough assembly 40 and a lower endless trough assembly 42 which are disposed so as to service the upper rows of cages 32, 36 and the lower rows of cages 34, 38, respectively. The upper endless trough assembly 40 includes a pair of elongated, open-topped troughs 44, 46, which are described in detail herein, and pair of closed conduits or tubes 48, 50. The troughs 44, 46 are adjacent to the upper rows of cages 34, 36, respectively, for holding feed 24 therein. Tube 48 is provided between a first end of the troughs 44, 46 and tube 50 is provided between the opposite ends of the troughs 44, 46. The lower endless trough assembly 42 includes a pair of elongated, open-topped troughs 52, 54, like those in the upper endless trough assembly 40 and which are described in detail herein, and pair of closed conduits or tubes 56, 58. The troughs 52, 54 are adjacent to the faces of the lower rows of cages 34, 38, respectively, for holding feed 24 therein. Tube 56 is provided between a first end of the troughs 52, 54 and tube 58 is provided between the opposite ends of the troughs 52, 54. The troughs 44, 46; 52, 54 and the tubes 48, 50; 56, 58 are mounted in association with the rows of cages 32, 36; 34, 38 by suitable means. The endless trough assemblies 40, 42 provide a continuous passageway for the feed 24 to move around the rows of cages 32, 36; 34, 38.

As shown in FIG. 1, feed 24 is delivered to the upper and lower endless trough assemblies 40, 42 from a remote source such as a bulk delivery bin 60 which can be conveniently located outside the poultry house (not shown). A header conveyor 62 extends into the house at an elevated location. Delivery tubes 64, 66 respectively, drop feed 24 from the header conveyor 62 to the upper and lower endless trough assemblies 40, 42.

A fill cup 68 is connected between the delivery tube 62 and the upper endless trough assembly 40, and a fill cup 70 is connected between the delivery tube 66 and the lower endless trough assembly 42. Preferably, approximately a three-quarter inch of feed 24 is maintained in the endless trough assemblies 40, 42. As the feed 24 is circulated around the endless trough assemblies 40, 42, by the novel feed moving element 28 described herein, the feed 24 which is not eaten by the poultry and is thus, returned to the fill cups 68, 70 is mixed with new feed 24 which is being delivered by the overhead header conveyor 62 and the associated drop tubes 64, 66.

The troughs 44, 46; 52, 54 used with the present invention include a bottom wall 72 which is generally flat-bottomed and a pair of opposed side walls 74, 76 which extend upwardly therefrom to an open top. The side walls 74, 76 have a lower portion 78, 80, respectively, each of which generally tapers toward the bottom wall 72 of the trough 44, 46; 52, 54 and an upper portion 82, 84 which extends generally straight upwardly such that the upper portion 82, 84 of the side walls 74, 76 are generally perpendicular to the bottom wall 72. A lip 86, 88 is formed on the uppermost end of each upper portion 82, 84, respectively of the trough side wall 74, 76 to prevent the spillage of feed 24 from the trough 44, 46; 52, 54. The tapered lower portion 78, 80 of the side wall 74, 76 continuously directs the feed 24 to the bottom of the trough 44, 46; 52, 54. The trough 44, 46; 52, 54 is made of a suitable non-corrosive material, such as metal, for example steel, or a suitable plastic, such as PVC. If the trough 44, 46; 52, 54 is made of plastic, the trough 44, 46; 52, 54 can be extruded as a closed tube-like member and thereafter, the top of the trough 44, 46; 52, 54 is cut open by suitable means to form the open-topped trough 44, 46; 52, 54 used with the present invention.

A novel feed moving element 28, in accordance with the present invention, is located within the troughs 44, 46 and tubes 48, 50 of the upper endless trough assembly 40 and a separate novel feed moving element 28, in accordance with the present invention, is located within the troughs 52, 54 and tubes 56, 58 of the lower endless trough assembly 42. Each feed moving element 28 takes the form of an endless, substantially planar, tortuous member and is called herein a spring element 28. This spring element 28 is most clearly shown in FIG. 2 and is made of a suitable, somewhat flexible, but high strength material, such as high tensile steel.

The spring element 28 is positioned within the endless trough assemblies 40, 42 at a lower portion of each of the troughs 44, 46; 52, 54 and preferably, the spring element 28 generally lays flat on the bottom wall 72 of the trough 44, 46; 52, 54 and extends across generally the entire width of the bottom wall 72 of the trough 44, 46; 52, 54. It is to be understood that the novel spring element 28 of the present invention can be used with troughs other than that shown in the drawings. The trough 44, 46; 52, 54 may include a shoulder 97 between the tapered lower portion 78, 80 of each side wall 74, 76 and the bottom wall 72 of each trough to provide a space in which the spring element 28 sits. The shoulder 97 also minimizes the possibility of the spring element 28 buckling upward to move away from the bottom wall 72 of the trough since the spring element 28 is effectively trapped against the bottom wall 72 of the trough by the shoulder 87 and in the space provided.

To move the feed 24 throughout the endless trough assemblies 40, 42, each spring element 28 is effectively "dragged" through each of the assemblies 40, 42, respectively, by a driving mechanism 90 described herein to continuously physically displace the spring element 28 along the length of each of the assemblies 40, 42. It is to be understood that the spring element 28 is not rotationally displaced as is effected in prior art flex augers. When the spring element 28 is positioned so that it lies generally flat along the bottom wall 72 of the trough 44, 46; 52, 54, a dead space between the spring element 28 and the bottom wall 72 of the trough 44, 46; 52, 54 where feed 24 could be trapped is substantially prevented.

As shown, each spring element 28 is serpentine or sinusoidal having a plurality of arcuate wireforms 92 continuously connected together. The wireforms 92 of each spring element 28 form open, spaced pockets 94 in which the feed 24 is moved when the spring element 28 is axially displaced along the length of the troughs 44, 46; 52, 54 and tubes 48, 50; 56, 58 in the endless trough assemblies 40, 42. When each spring element 28 is dragged through the respective assembly 40, 42, however, the movement of feed is not limited to the bottom of the trough 44, 46; 52, 54 and instead, due to the weight of the feed 24, the entire amount of feed 24 in the trough 44, 46; 52, 54 is axially displaced along the length of the trough 44, 46; 52, 54. It is to be understood that the spring element 28 may take other forms than the arcuate wireforms 92, such as having squared-off continuously connected wireforms, so long as the spring element is substantially planar and provides for the open, spaced apart pockets 94. The spring element 28 may also have various widths, pitches and wire diameters.

The driving mechanism 90 used in accordance with the present invention axially displaces the spring element 28 along the length of the troughs 44, 46; 52, 54 and the tubes 48, 50; 56, 58 in each of the endless trough assemblies 40, 42. The driving mechanism 90 includes a gear or sprocket 96 which is mechanically driven by a suitable motor 98. The motor 98 is operated by suitable control circuitry (not shown). The motor 98 and the sprocket 96 are interconnected together by a shaft 100 which extends through a side wall 74 of the trough 44, 46; 52, 54. Tests of this system 22 show that for every one hundred and fifty feet (150') of spring element 28, one (1) motor 98 is needed to axially displace the spring element 28 along the respective endless trough assembly 40, 42.

Figure 4:
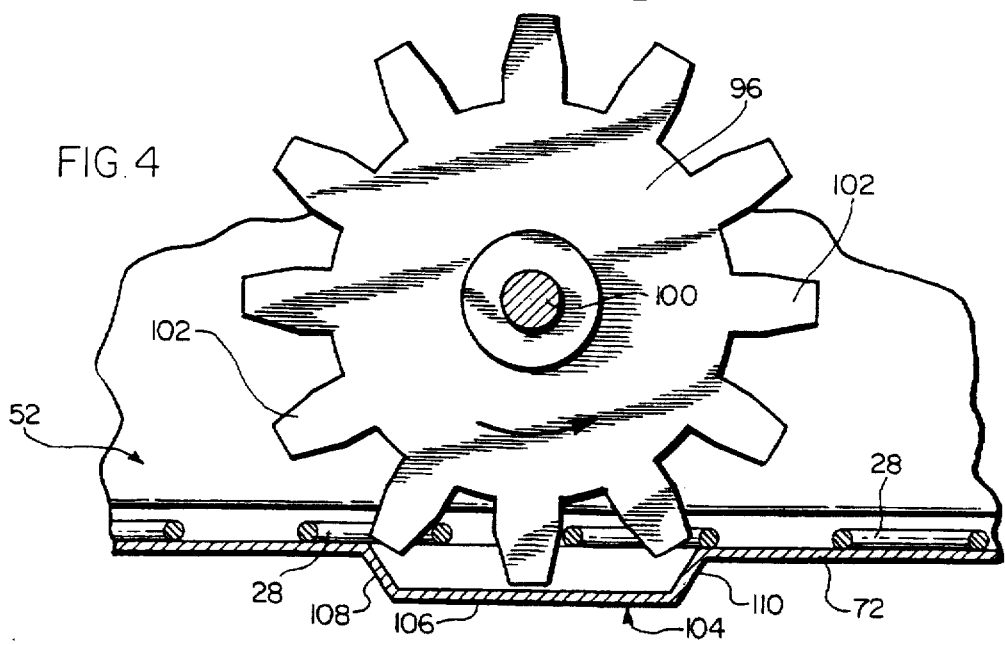
FIG. 4 is a cross-sectional view along line 4—4 of FIG. 3.

As shown in FIG. 4, the sprocket 96 has a plurality of straight cut teeth 102, each of which contacts the spring element 28 at the pitch diameter of the tooth 102 of the sprocket 96. So that the teeth 102 of the sprocket 96 can contact the wireforms of the spring element 28 at the pitch diameter of the sprocket teeth 102 while allowing the spring element 28 to lay flat on the bottom wall 72 of the trough 44, 46; 52, 54, a recess 104 is formed in the bottom wall 72 of each trough 44, 46; 52, 54 beneath the sprocket 96 so that a portion of the sprocket teeth 102 can go below the height of the bottom wall 72 of the trough when the sprocket 96 is rotated by the motor 98. The recess 102 may be formed by suitable means in the trough, such as by stamping. The recess 102 has a bottom wall 106, a front wall 108, a rear wall 110 and side walls 112. The front, rear and side walls 108, 110, 112 of the recess 104 connect the bottom wall 106 of the recess 104 to the bottom wall 72 of the trough 44, 46; 52, 54. The side walls 112 are spaced apart from each other a distance which is slightly greater than the width of the sprocket teeth 102. The front and rear walls 108 and 110 may be tapered to promote the movement of feed 24 from out of the recess 102 when the sprocket 96 is rotated, and to prevent any dead space within the recess 102. It is to be understood that the recess 104 may have straight front and rear walls 108, 110 if desired.

In operation, each motor 98 pulls and pushes on each spring element 28 to drag each spring element 28 along the length of the respective endless trough assembly 40, 42. Each of the motors 98 are operated at the same speed so that the respective spring element 28 is not stretched or compacted to any great extent. The motor speed matching is caused by suitable electrical circuitry (not shown). Some stretching or compacting of the spring element 28 may occur when the respective spring element 28 is drawn around the corner between the respective trough 44, 46; 52, 54 and the tubes 48, 50; 56, 58. The material of which each spring element 28 is formed, i.e. high tensile steel, has sufficient flexibility so that it can slightly deform as it is passes around the corner but will reassume its initial shape after the corner has been passed. Use of the spring element 28 in the feed conveyor system 22 of the present invention provides a feed moving system which is stronger, more flexible, more efficient and lasts longer than conventional helical auger systems.

The feed conveying system 22 of the present invention which is used in the feed distribution apparatus 20 permits the strict control of feeding of the poultry, floor animals or the like, and carries feed 24 smoothly and rapidly to the various positions where the poultry, floor animals or the like, are located which is important since a constant supply of fresh feed 24 at predetermined amounts promotes higher egg production by the poultry. In addition, the system 22 saves manual labor and reduces feed spillage and waste.

The novel feed conveying system 22 of the present invention uses approximately one-half of the normal power consumed by a standard system, such as the centerless auger system disclosed in U.S. Pat. No. 4,495,894, while not presenting a reduction in feed carrying and moving capacity. This occurs because the amount of "pull" or "push" required to move the spring element 28 is substantially less than that of current prior art designs. For example, the weight per foot of system is: 0.12 pounds per foot for the novel spring element 28 of the present invention while 0.44 pounds per foot for a conventional system. This can amount to thousands of dollars in savings for a grower, without any appreciable effect on performance.

It is to be noted that some mixing of feed 24 may occur during operation of the feed conveying system 22. In addition, mixing of the feed 24 occurs when stopping or starting or starting the system 22.

Figure 5:
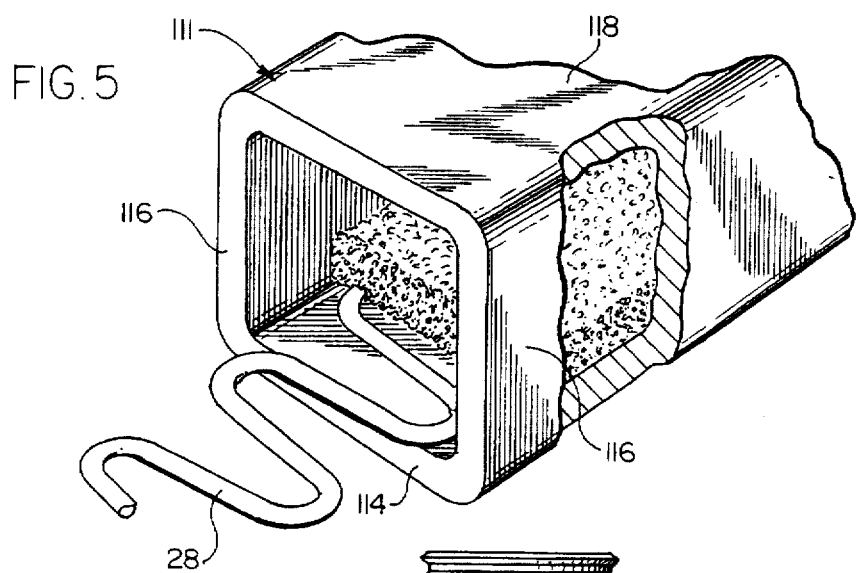
FIG. 5 is a perspective view of a portion of the feed conveying system showing a second embodiment of a trough member having feed therein, the feed being partially cut away to show a novel spring element in accordance with the present invention along a bottom portion of the trough member.

Directing attention FIG. 5, an alternate flat-bottomed trough 111, which takes the form of an enclosed tube and which can be used with spring element 28 of the present invention as described herein, is illustrated. The trough 111 has a flat bottom wall 114, upstanding side walls 116 and a top wall 118 which forms an enclosed tube. The spring element 28 is positioned within the enclosed tube-like trough 111 at a lower portion of the trough 111 and preferably, the spring element 28 generally lays flat on the bottom wall 114 of the trough 111 and extends across generally the entire width of the bottom wall 114 of the trough 111. The trough 111 is made of a suitable non-corrosive material, such as metal, for example steel, or a suitable plastic, such as PVC. If the trough 111 is made of plastic, the trough 111 can be extruded as a closed tube.

Figure 3:
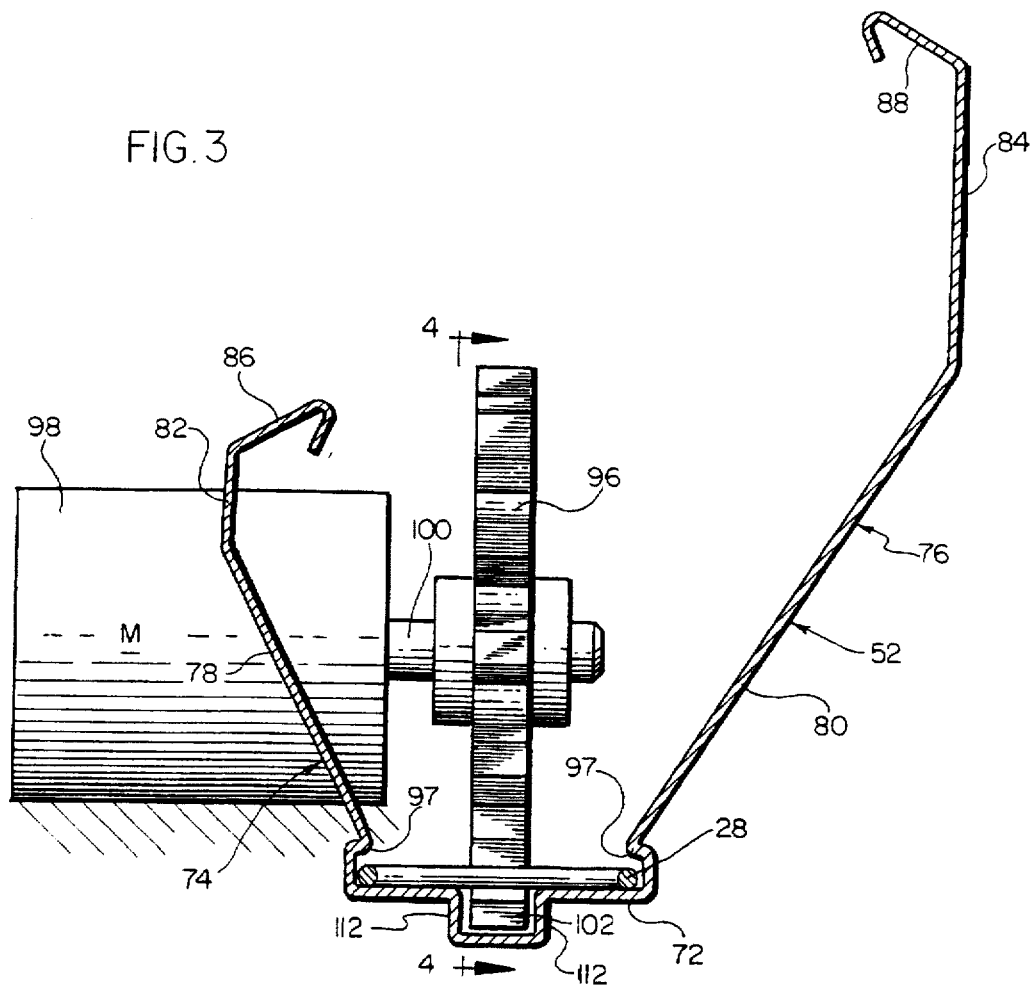
FIG. 3 is a cross-sectional view of the trough member showing a driving mechanism therein for moving the spring element through the trough member.

The trough 111 can be incorporated into the endless trough assembly shown in FIG. 1. Alternatively, as shown in FIG. 6, the tube-like trough 111 can be used in an endless assembly to feed floor poultry. The trough 111 has at least one intake hopper 120 attached thereto and one or more feeder units 122 (only one of each of which is shown) which are connected to and depend downwardly therefrom for supplying feed to broilers, for example. As shown in FIG. 7, the tube-like trough 111 can also be used in an endless assembly to feed floor animals, such as hogs. The hogs are housed in individual or multiple hog pens. The trough 111 has an intake hopper (not shown) attached thereto and a plurality of conventional drop boxes 124 which are connected to and depend downwardly therefrom. With this tube-like trough 111, a driving mechanism like the driving mechanism 90 shown in FIGS. 3 and 4 is used to push and pull the spring element 28 through the trough 111.

To convey the feed to the floor animals, the feed is moved into the trough 111 through the intake hopper. The spring element 28 moves the feed through the trough 111 as explained hereinabove and the feed drops into the feeder units 122, or through the drop boxes 124 and onto the floor.

While a preferred embodiment of the present invention is shown and described, it is envisioned that those skilled in the art may devise various modifications of the present invention without departing from the spirit and scope of the appended claims.

The invention claimed is:

1. A feed conveyor for delivering feed to animals, said feed conveyor comprising: a trough member for holding the feed, said trough member including a bottom wall; a spring element disposed within the trough member for moving the feed through the trough member when said spring element is moved within the trough, said spring element being a winding, tortuous member which lies on, and substantially conforms with the bottom wall of the trough member; and a driving mechanism for moving the spring element within the bottom wall of the trough member to selectively move substantially all of the feed located in the trough member through the trough member and deliver the feed to said animals.

2. A feed conveyor as defined in claim 1, wherein said trough member and said spring element are continuous.

3. A feed conveyor as defined in claim 1, wherein said spring element is a sinusoidal wave form.

4. A feed conveyor as defined in claim 1, wherein said spring element generally extends from one side of the bottom of the trough member to another side of the bottom of the trough member.

5. A feed conveyor as defined in claim 1, wherein said spring element has generally arcuate windings along the length of the spring element.

6. A feed conveyor as defined in claim 1, wherein said bottom wall of said trough member and said conforming spring element are generally flat.

7. A feed conveyor as defined in claim 1, wherein said trough member is a tube-like member.

8. A feed conveyor as defined in claim 1, wherein said trough member has an open top.

9. A feed conveyor for delivering feed to animals, said feed conveyor comprising: a trough member having a cross-sectional form for holding the feed which is to be delivered to the animals; a spring element disposed within the trough member for moving the feed through the trough member when said spring element is moved through the trough, said spring element being a continuous winding, tortuous member having leg portions and connecting portions between said leg portions; and a driving mechanism for moving the spring element along the trough member to selectively move substantially all of the feed located in the trough member through the trough member and deliver the feed to said animals; wherein the leg portions of said spring element lie on, and substantially conform with a lower portion of the cross-sectional form of the trough member.

10. A feed conveyor as defined in claim 9, wherein said spring element is a sinusoidal wave form.

11. A feed conveyor as defined in claim 9, wherein said spring element generally extends from one side of the bottom of the trough member to another other side of the bottom of the trough member.

12. A feed conveyor as defined in claim 9, wherein said spring element has generally arcuate windings along the length of the spring element.

13. A feed conveyor as defined in claim 9, wherein said trough member includes a lower portion which is generally flat and said spring element includes legs which substantially conform with said generally flat lower portion.

14. A feed conveyor as defined in claim 9, wherein said trough member is a tube-like member.

15. A feed conveyor as defined in claim 9, wherein said trough member has an open top.

16. A feed conveyor for delivering feed to animals, said feed conveyor comprising: a trough member for holding the feed which is to be delivered to the animals or the like, said trough member including a bottom wall; a spring element disposed within the trough member for moving the feed through the trough member when said spring element is moved through the trough, said spring element being a continuous, winding, tortuous member, the entire form of which substantially conforms with and lies along the bottom wall of the trough member; and a driving mechanism for moving the spring element along the trough member to selectively move substantially all of the feed located in the trough member through the trough member and deliver the feed to said animals.

17. A feed conveyor as defined in claim 16, wherein said spring element is a sinusoidal wave form.

18. A feed conveyor as defined in claim 16, wherein said spring element generally extends from one side of the bottom of the trough member to another side of the bottom of the trough member.

19. A feed conveyor as defined in claim 16, wherein said spring element has generally arcuate windings along the length of the spring element.

20. A feed conveyor as defined in claim 16, wherein said trough member includes a bottom wall which is generally flat.

21. A feed conveyor as defined in claim 16, wherein said trough member is a tube-like member.

22. A feed conveyor as defined in claim 16, wherein said trough member has an open top.

* * * * *